United States Patent [19]

Takano

[11] Patent Number: 4,493,681
[45] Date of Patent: Jan. 15, 1985

[54] REINFORCED COG BELT
[75] Inventor: Hiroshi Takano, Miki, Japan
[73] Assignee: Mitsuboshi Belting Ltd., Kobe, Japan
[21] Appl. No.: 428,418
[22] Filed: Sep. 29, 1982
[30] Foreign Application Priority Data
Jan. 26, 1982 [JP] Japan ............................... 57-9299[U]
[51] Int. Cl.³ .............................................. F16G 5/10
[52] U.S. Cl. ..................................... 474/265; 474/250
[58] Field of Search .............................. 474/264–266,
474/270, 268, 260, 261, 250, 251, 204, 205;
428/294, 397

[56] References Cited

U.S. PATENT DOCUMENTS

| | | | |
|---|---|---|---|
| 1,890,080 | 12/1932 | Freedlander | 474/251 |
| 2,625,828 | 1/1953 | Nassimbene | 474/250 |
| 3,485,707 | 12/1969 | Spicer | 474/265 X |
| 3,869,933 | 3/1975 | Dorf | 474/263 |
| 3,941,005 | 3/1976 | Gardiner et al. | 474/265 X |
| 4,151,755 | 5/1979 | Allaben, Jr. | 474/250 X |

Primary Examiner—Stephen J. Novosad
Assistant Examiner—Thuy M. Bui
Attorney, Agent, or Firm—Wood, Dalton, Phillips, Mason & Rowe

[57] ABSTRACT

A V-section cog belt having a rubber body provided with longitudinally spaced inner cogs defining an inner surface. The belt is provided with conventional tensile cords extending longitudinally thereof. Rigid metal reinforcement members are provided in the cogs extending transversely across the belt in outwardly spaced relationship to the inner surface thereof. The reinforcement members may have any one of a plurality of different configurations, including tubular configurations and solid cross section configurations. The outer and inner surfaces of the tubular configurations may be similar or different as desired. In one form, the reinforcement members are spring plates. The reinforcement members may be provided as single members in each of the cogs or a plurality of members in the cogs as desired.

19 Claims, 16 Drawing Figures

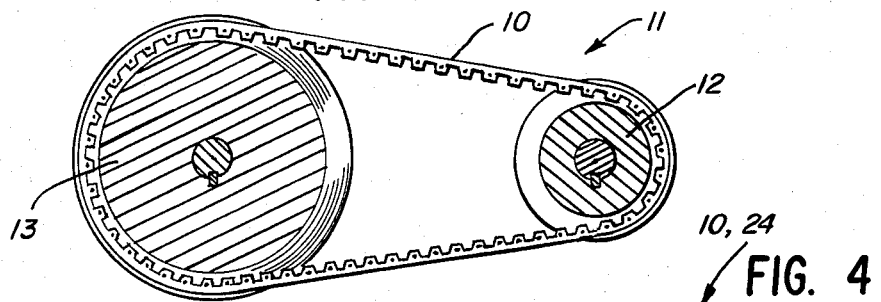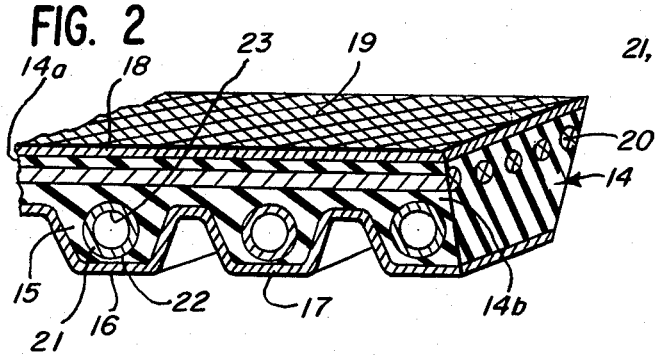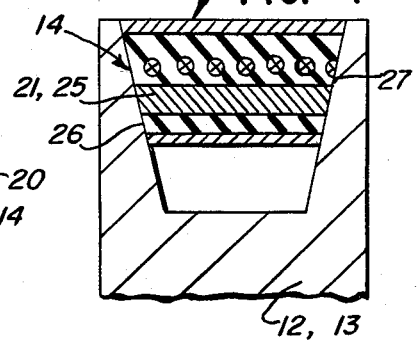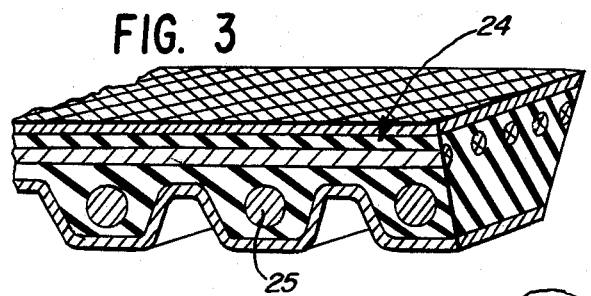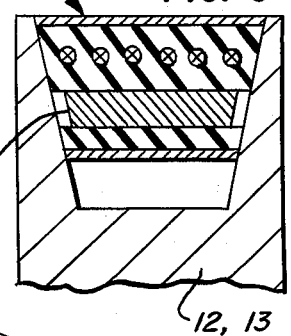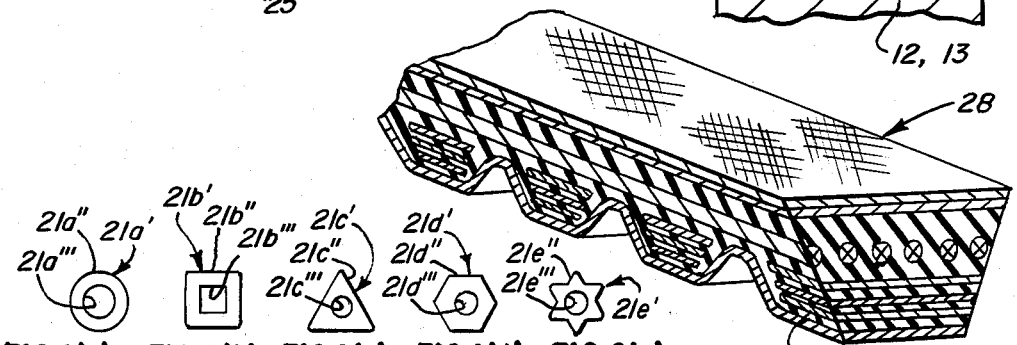

REINFORCED COG BELT

BACKGROUND OF THE INVENTION

1. Field of the Invention

This invention relates to V-belts and in particular to cog-type V-belts.

2. Description of the Background Art

In one form of V-shaped power transmission belt, the inner surface portion thereof is wave-shaped so as to define a plurality of longitudinally spaced cogs for providing improved flexibility of the belt in passing around the pulleys of the drive system. Because of the resiliency of the rubber body, the belt tends to warp laterally and otherwise deform in engaging the pulleys, thus decreasing the power transmission ability of the belt and causing damage to the belt so as to undesirably shorten the useful life thereof.

One attempted solution to this problem has been to provide reinforcement in the cog portion of such a V-belt formed of Stiflex, reinforcing fabric, reinforcing tire cords, etc. It has been found that use of such reinforcement has been inadequate to meet the high power transmission demands of modern machinery and apparatus, illustratively such as in transmission mechanisms of motorcycle torque converters, farming machine torque converters, etc.

Another attempted solution to the problem has been the provision of synthetic resin buried in the belt cog portions. This attempted solution has not been completely satisfactory because of the fusing of the resin by heat developed during the driving operation of the belt, resulting in abrasion and deformation of the belt.

Similarly, another attempted solution has been to use rigid rubber elements in the belt cog portions. These have not proven completely satisfactory because of the elasticity thereof.

Illustratively in U.S. Pat. No. 2,189,049, Gustave Ungar discloses a V-belt wherein the inner surface of the compression section of the belt consists of a fabric layer having a weft consisting of alternating metal rods and cotton cords. More specifically, the inner section of the belt consists of a number of light metal rods which are surrounded on the inside by one or more plies of fabric and on the outside by one or more plies of fabric. The fabric layers are bent around the rods so as to in engagement with each other and are fastened together by means of stitches or staples.

The fabric forming the compression section defines one or more plies arranged in waves in such a manner that the cotton weft forms the crests and the metal rods form the sides of the waves.

SUMMARY OF THE INVENTION

The present invention comprehends an improved V-section cog belt structure wherein elongate, rigid metal reinforcing members extend transversely across the belt cogs in outwardly spaced relationship to the inner surface of the rubber body thereof.

In one form, the inner surface of the rubber body is covered with a fabric layer.

In one form, the outer surface of the rubber body is covered with a fabric layer.

In the illustrated embodiment, the reinforcing members alternatively comprise tubular members or solid cross section members.

In one form, the reinforcement members are provided with a rounded outer periphery, and in another form, the reinforcement members are provided with a polyhedral outer periphery.

In still another form, the reinforcement members are provided with an outer periphery defining a plurality of projections.

In one form of the belt construction utilizing tubular reinforcement members, the reinforcement members have an outer configuration different from the inner configuration thereof.

In one form, the metal reinforcement members extend the full width of the rubber body in the cogs, and in another form, they extend less than the full width so as to have the opposite ends thereof spaced inwardly from the opposite side surfaces of the belt.

The invention comprehends that a plurality of the reinforcement members be provided in each of the cogs.

In another form of the invention, the reinforcement members comprise flat springy plates embedded in the cogs.

In the illustrated embodiment, the plates have a thickness in the range of approximately 0.15 to 2 mm., and an elastic coefficient of at least approximately 15,000 kg/mm$^2$.

In one form, the springy plates are formed of a synthetic resin.

The invention comprehends the provision of the reinforcement members of a material having high thermal conductivity so as to provide improved dispersion of heat developed in the V-belt during operation thereof to the outside surfaces for heat transfer to the ambient atmosphere for improved long life of the belt.

Thus, the cog belt of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is an elevation illustrating a drive system using a cog belt embodying the invention;

FIG. 2 is a fragmentary perspective view illustrating one form of the cog belt embodying the invention having tubular reinforcement members, the belt being shown in both longitudinal and transverse section;

FIG. 3 is a view similar to that of FIG. 2 but illustrating a modified form of belt embodying the invention having reinforcement members of solid cross section;

FIG. 4 is a transverse section of a belt embodying the invention illustrated in association with a pulley of the drive system;

FIG. 5 is a view similar to that of FIG. 4 but illustrating a modified form of belt embodying the invention wherein the reinforcement members extend less than fully transversely across the belt;

FIGS. 6(a–e) and 7(a–e) illustrate a plurality of different reinforcement members having different cross-sectional configurations for use in the cog belt of the invention; and FIG. 8 is a fragmentary perspective view of a modified form of cog belt embodying the invention having a plurality of spring plates defining the reinforcement members thereof, the belt being shown in both longitudinal and transverse section.

DESCRIPTION OF THE PREFERRED EMBODIMENTS

In the illustrative embodiment of the invention as shown in FIGS. 1, 2 and 4 of the invention, a V-section cog belt generally designated 10 is provided for use in a drive system generally designated 11 having driving and driven pulleys 12 and 13 about which the belt is entrained in providing a driving connection therebetween.

As seen in FIGS. 2 and 4, belt 10 includes a V-section cushion rubber body 14 having longitudinally spaced inner cogs 15 defining an inner surface 16. A fabric layer 17 covers inner surface 16.

The belt body further defines an outer surface 18 which is provided with a covering fabric 19. A plurality of longitudinally extending tensile cords 20 are provided in the belt body outwardly of the cogs and inwardly of the outer surface 18 for providing controlled longitudinal strength of the belt.

The invention comprehends the provision in cogs 15 of elongate rigid metal reinforcement members 21 extending transversely across the cogs in outwardly spaced relationship to inner surface 16 so as to be effectively embedded in the cogs. In the embodiment of FIG. 2, the reinforcement members comprise tubular members having an outer periphery 22 and an inner periphery 23.

Referring to the embodiment of FIG. 3, a cog belt generally designated 24 is shown to comprise a cog belt similar to cog belt 10 but wherein the reinforcement members 25 comprise solid cross section members in lieu of the hollow members 21 of belt 10. In all other respects, belt 24 is similar to belt 10.

As illustrated in FIG. 4, the reinforcement members 21 or 25 of belts 10 or 24 may extend fully across the width of the cog 15 so as to terminate in the side surfaces 26 and 27 of the belt. Alternatively, as illustrated in FIG. 5, in a modified form of the belt 10a or 24a, the reinforcement members 21a or 25a may have a length less than the width between the side surfaces of the belt so as to terminate in inwardly spaced relationship to the side surfaces, thereby avoiding engagement of the reinforcing members with the sidewalls of the pulley 12 or 13. In all other respects, the belts 10a and 24a are similar to the belts 10 and 24 discussed above.

Referring now to FIGS. 6(a-e), the invention comprehends the provision of the reinforcing members in any one of a plurality of different cross-sectional configurations. Thus as seen in FIG. 6 relative to the tubular reinforcement members generally designated 21, such members may have a plurality of different outer peripheral configurations and inner peripheral configurations. Thus, as shown in FIG. 6a, one illustrative tubular reinforcement member 21a' may be provided with a circular outer peripheral surface 21a" and a circular inner surface 21a'''.

In FIG. 6b, the outer surface 21b" of the member 21b' is rectangular, and more specifically, is square, and the inner surface 21b''' is retangular, and more specifically, square.

In FIG. 6c, the outer surface 21c" of member 21c' is triangular and the inner surface 21c''' has a different configuration from the outer surface, and more specifically, as illustrated, is round or circular. Thus, the embodiment of FIG. 6 illustrates the arrangement wherein the outer surface differs in configuration from the inner surface.

As further illustrated in FIG. 6d, the outer surface 21d''' of member 21d' may be polyhedral, and more specifically, as illustrated, is hexahedral. As shown, the inner surface 21d''' may be round.

Another form of tubular member 21e' is illustrated in FIG. 6e as having a plurality of outwardly extending projections 21e" defining the outer surface thereof. In the embodiment 21e', the inner surface 21e''' is round.

As further illustrated in FIGS. 7(a-e), the reinforcing members 25 having a solid cross section illustratively may comprise members having different outer surface configurations. Thus, reinforcing member 25' of FIG. 7a may be provided with a circular outer surface 25a".

Reinforcing member 25b' in FIG. 7b may be provided with a rectangular, and more specifically, as illustrated, square outer surface 25b". The solid section reinforcing members may have any desirable polyhedral surface configuration, and as illustrated in FIG. 7c, reinforcement member 25c' is provided with a tetrahedral outer surface configuration 25c". Reinforcement member 25d in FIG. 7d is provided with a hexahedral outer surface 25d". Reinforcement member 25e' is provided with an outer surface defining a plurality of projections 25e".

The different surface configurations illustrated in FIGS. 6 and 7 are exemplary. As will be obvious to those skilled in the art, other suitable surface configurations may be employed within the scope of the invention as desired.

Still another modified form of belt embodying the invention generally designated 28 is illustrated in FIG. 8 to comprise a belt generally similar to belt 10, but wherein the reinforcement members 29 comprise a plurality of spring plate members. As shown in FIG. 8, a plurality of the spring plate members may be provided in each cog in parallel spaced relationship.

The belt body may be formed of suitable power transmission belt material, such as natural rubber, styrene butadiene rubber, polychloroprene rubber, nitrile rubber, etc. The rubber body may be formed in the conventional manner utilizing an outer rubber layer 14a and an inner rubber layer 14b cooperatively embedding the tensile cords 20. As is further conventional, the rubber material of the body may comprise rubber blends, as desired.

The outer covering fabric 19 preferably comprises a bias fabric illustratively formed of cotton warp and woof yarns. Further illustratively, the fabric 19 may comprise a wide angle fabric. The cover fabric may be laminated to the outer surface 18 of the rubber body in one or more layers, such as from one to three layers.

The tensile cords may comprise conventional polyester, aliphatic polyamide, glass fiber, etc., cords having relatively high strength and low extensibility.

In the illustrated embodiment, the fabric 17 comprises a fabric similar to fabric 19. Alternatively, fabric 17 may comprise an elastic woven fabric formed of wood, a fabric formed of crimped nylon warp and normal nylon weft yarns, etc.

In the illustrated embodiment, the reinforcing members are preferably formed of a strong metal. Illustratively, the metal may comprise a ferrous metal, such as iron or an iron alloy, such as steel, aluminum or an aluminum alloy.

The reinforcing plates 29 of belt 28 are preferably formed of an elastic metal having a thickness in the range of approximately 0.15 to 2 mm., and a coefficient of elasticity of at least 15,000 kg/mm$^2$. In the illustrated embodiment, the plurality of plates 29 in each cog may be provided in the form of a laminate with interposed layers of synthetic resin or may be embedded in spaced relationship in the rubber material of the belt body, as desired. Alternatively, the plates may be formed of synthetic resin. The pitch and configuration of the cogs may be varied as desired by the user.

As discussed above, the reinforcing members provide improved lateral stability of the belt. The reinforcing members provide for absorption of impulsive stresses developed in the belt during driving operation. The reinforcing members resist dishing of the belt as may occur with conventional belt configurations so as to provide improved power transmission and effectively prevent permanent dish deformation as occurs in prior art belts.

The use of the spring plates 29 resists the shearing forces developed by the loading of the belt during driving operation. The elasticity of the plates and the interposed rubber or synthetic resin layers causes the stresses to be dispersed in the cogs to provide improved stable transmission characteristics. It has been found that this belt construction transmits power with less belt volume while reducing the amount of floating of the belt caused by the centrifugal forces developed in high speed operation.

Still further, by use of reinforcing members having high thermal conductivity as discussed above, heat developed within a belt during the drive operation is readily transmitted to the ambient atmosphere, thereby substantially improving the belt life.

The foregoing disclosure of specific embodiments is illustrative of the broad inventive concepts comprehended by the invention.

I claim:

1. A V-section cog belt comprising:
    an elongated V-section rubber body having longitudinally spaced, inner cogs defining an inner surface and side edges;
    tensile cords extending longitudinally of the belt outwardly of said cogs;
    tubular rigid metal reinforcement members extending transversely across the belt in said cogs in outwardly spaced relationship to said inner surface thereof, said members being hollow and opening to said side edges for passing cooling air therethrough during driving operation of the belt; and
    a fabric layer covering said inner surface of the rubber body inwardly of said reinforcement members.

2. A V-section cog belt comprising:
    an elongated V-section rubber body having longitudinally spaced, inner cogs defining an inner surface and side edges;
    tensile cords extending longitudinally of the belt outwardly of said cogs;
    elongate rigid metal reinforcement members extending transversely across the belt in said cogs in outwardly spaced relationship to said inner surface and in recessed relationship to said side edges and within the opposite ends thereof exposed to the ambient atmosphere for heat transfer thereto; and
    a fabric layer covering said inner surface of the rubber body inwardly of said reinforcement members.

3. The cog belt of claims 1 or 2 wherein said metal reinforcement members comprise tubular members.

4. The cog belt of claims 1 or 2 wherein said metal reinforcement members have a rounded periphery.

5. The cog belt of claims 1 or 2 wherein said metal reinforcement members have a polyhedral periphery.

6. The cog belt of claims 1 or 2 wherein said metal reinforcement members have a periphery defining a plurality of projections.

7. The cog belt of claims 1 or 2 wherein said metal reinforcement members comprise tubular members having an outer configuration different from the inner configuration thereof.

8. The cog belt of claim 1 or 2 wherein said metal reinforcement members comprise tubular members having a polyhedral outer configuration and a rounded inner configuration.

9. The cog belt of claims 1 or 2 wherein said metal reinforcement members comprise tubular members having an outer periphery defining a plurality of projections and a rounded inner configuration.

10. The cog belt of claims 1 or 2 wherein a plurality of said reinforcement members is provided in each cog.

11. The cog belt of claims 1 or 2 wherein said metal reinforcement members comprise flat plates.

12. The cog belt of claims 1 or 2 wherein said metal reinforcement members are formed of a ferrous metal.

13. The cog belt of claims 1 or 2 wherein said metal reinforcement members are formed of aluminum.

14. The cog belt of claims 1 or 2 wherein said metal reinforcement members are formed of a metal having high thermal conductivity.

15. The cog belt of claims 1 or 2 wherein said metal reinforcement members comprise spring plates having a thickness in the range of approximately 0.15 to 2 mm.

16. The cog belt of claims 1 or 2 wherein said metal reinforcement members comprise spring plates having an elastic coefficient of at least approximately 15,000 $kg/mm^2$.

17. The cog belt of claims 1 or 2 further including a fabric layer covering an outer surface of the rubber body outwardly of said tensile cords.

18. The cog belt of claims 1 or 2 wherein said metal reinforcement members comprise a laminate construction of metal plates and interposed synthetic resin layers.

19. The cog belt of claim 2 wherein said metal reinforcement members comprise solid cross section members.

* * * * *